Nov. 25, 1930.   S. BARTHOLOMEW   1,782,673
DRINKING FOUNTAIN FOR POULTRY OR SMALL ANIMALS

Filed Nov. 7, 1928

INVENTOR.
SHERMAN BARTHOLOMEW,
BY

ATTORNEYS

Patented Nov. 25, 1930

1,782,673

UNITED STATES PATENT OFFICE

SHERMAN BARTHOLOMEW, OF GUERNEVILLE, CALIFORNIA, ASSIGNOR OF ONE-HALF TO HARRY HARRIS, OF RIONIDE, CALIFORNIA

DRINKING FOUNTAIN FOR POULTRY OR SMALL ANIMALS

Application filed November 7, 1928. Serial No. 317,721.

This invention relates to drinking fountains for poultry or small animals, and it has for its object to provide an improved device of this character, comprising a tank adapted to hold, say about fifteen gallons of water, which is sufficient for a day's supply for about five hundred small chickens. The tank is to be supplied from a source of water under pressure, and the device is so arranged that when a valve is opened and the water is turned into the apparatus, the tank will be filled. The overflow from the tank will act to flush out the drinking pan, and after the water is shut off from the source of supply, the tank will act automatically, upon the barometric principle, to maintain a supply of fresh water for the chickens, or other animals, throughout the day.

Further objects and advantages of the invention will be set forth in the detailed description which follows.

Figure 1:
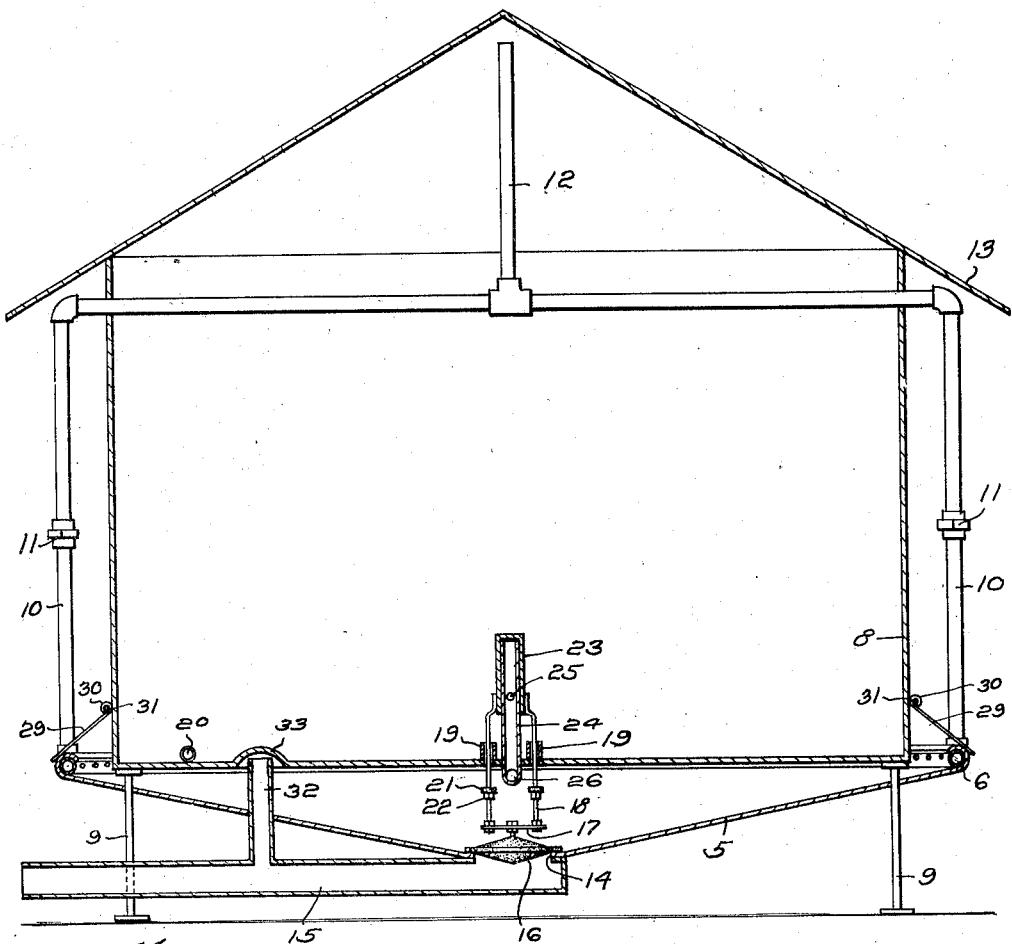
Figures 2, 3:
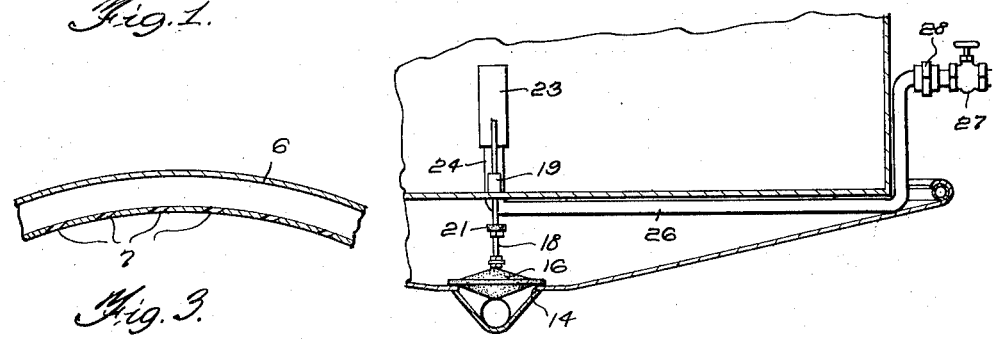

In the accompanying drawing:

Fig. 1 is a view in vertical section of the device, constructed in accordance with the invention, Fig. 2 is a fragmentary sectional view at right angles to Fig. 1, illustrating the supply pipe and associated parts, and Fig. 3 is a detail view illustrating a fragment of a circumferential perforated pipe, hereinafter described.

Like numerals designate corresponding parts in all of the figures of the drawing.

Referring to the drawing, it will be seen that the device comprises a shallow pan 5, the edges of which are rolled over for the reception of an annular pipe 6, which extends around the edge of the pan, and is perforated at 7, the perforations being at such an angle as to discharge water tangentially with respect to the pan, so that a whirling action of the water is set up in the flushing of the pan. A tank 8 is supported upon legs 9, which are soldered into tight connection with the pan 5, where they pass through the same. Pipes 10, having unions 11, in their length, extend upwardly from the pipe 6, and at their point of juncture connect with an upstanding overflow pipe 12, the upper end of which terminates adjacent the top of the tank. An overhang 13, upon the tank top, prevents dirt, trash and the like from falling into the pan 5. At its lowest point, the pan 5 is provided with a discharge opening 14, which is in communication with a drain pipe 15. The opening 14 is adapted to be closed by a suitable valve 16, which may be of rubber, such as is commonly employed in closet flush tanks. The valve 16 is carried by a cross bar 17, that is, in turn, mounted upon the lower ends of a pair of rods 18. These rods pass freely through guide tubes 19, which are soldered to the bottom of the tank and extend a sufficient distance above the bottom of the tank to prevent the passage of dirt, sediment, and the like, from the tank to the pan. A clean out plug 20 is threaded into the side wall of the tank adjacent the bottom thereof, to permit of the removal of the sediment that collects in the tank, when that becomes necessary.

The rods 18 carry rubber gaskets 21, which are adjustably held in place by nuts 22, upon the rods 18, and these gaskets constitute valves for closing the lower ends of the tubes 19, when moved upwardly against said tubes, as hereinafter described. The upper ends of the rods 18 are soldered, or otherwise rigidly connected to a, preferably, brass valve 23, of inverted cup shape, which is slidably disposed upon the upper end of a water supply pipe 24, which has one or more discharge outlets 25, in its side, some distance below its top. Water is supplied to the discharge pipe 24, through a lateral supply pipe 26, which is, in turn, controlled by a valve 27, and which has a union 28, in its length.

The operation of the device, as far as the same has been described, is as follows: When the valve 27 is opened, water flows upwardly through pipe 24, and acting against the closed end of the cup like member 23, forces said cup like member upwardly to uncover the openings 25 and to bring the valves 21 into closing engagement with the lower ends of the tubes 19. The water flowing from the openings 25 then fills the tank until it overflows through pipes 12 and 10, escaping through the openings 7 of pipe 6, with a whirling motion, which thoroughly flushes and cleanses the drinking pan, the flushing water escaping through opening 14; it being clear that the lifting of the valve 23 raised valve 16, through the connections described. After the operator considers that the pan has been sufficiently flushed, he closes the valve 27, and since the water no longer acts against the underside of cup 23, said cup descends, closing valve 16 and opening valves 21. Thereupon the water standing in pipes 11, and 12, flows out of said pipes through openings 7, to fill the pan, and water flows through the tubes 19 around the rods 18, also to fill said pan. The openings 7 act as an air vent for the tank until the water in the pan rises to the level of said openings which is also the level of the lower ends of the tubes 19 and the level of the bottom of the tank. Thereafter, no air can get into the tank and, consequently, the water will cease to enter the pan. Thereafter, the device will act upon the barometric principle, as the poultry, or animals, use the water from the pan, by drinking the same from the circumferential path between the outer side of the tank and the pipe 6. To prevent the poultry, or animals, getting bodily into this space, wires 29 are provided, which extend between the outer wall of the tank and the outer edge of the pan, and, preferably, these wires are provided with eyes 30, which are strung upon a circumferential wire 31, the outer ends of the wires resting upon the outer edge of the pan.

The drain pipe 15 is, preferably, provided with an overflow pipe 32, so that if the tank should become punctured, or an air leak in the pipes should develop, the water cannot rise above the level of the outer edge of the pan, but, on the contrary, would first escape through the drain pipe 32. The bottom of the tank may be provided with a cavity 33, for the upper end of the drain pipe, if desired.

By disconnecting the unions 11 and the union 28, the tank with its valve mechanism 23 and associated parts, may be lifted free of the pan.

From the foregoing description, it will be seen that simple and efficient means are herein provided, whereby substantially all labor incident to watering small stock, is eliminated, it being only necessary for the operator to open and close the valve on the supply line. By doing this, the structure is first flushed and cleaned and thereafter automatically acts, as described, to maintain a clean, fresh supply of water.

It is to be understood that the invention is not limited to the precise construction set forth, but that it includes, within its purview, whatever changes fairly come within either the terms or the spirit of the appended claims.

Having described my invention, what I claim is:

1. A device of the character described comprising a tank and a pan, a drain outlet from the pan, a drain valve controlling said outlet, a water supply pipe and a water pressure operated valve operated by the water from said pipe, which controls said drain valve and the passage of water to said tank and an overflow pipe having its mouth disposed in said tank and discharging into said pan.

2. A device of the character described, comprising a pan, deepest at its central portion, a tank disposed thereabove, an annular pipe extending around the outer edge of said pan and perforated for the discharge of water tangentially thereof, a pipe connected to said annular pipe and constituting an overflow pipe for the tank which terminates adjacent the top of said tank, a discharge outlet at the central portion of said pan, a valve for controlling said discharge outlet, a water supply pipe projecting upwardly into the tank, a member of inverted cup shape slidably mounted upon the upper end of said water supply pipe, and connections between said member of inverted cup shape and said valve, upward movement of said cup shape member permitting the entry of water to the tank, said upward movement being under the influence of the water discharged through the water supply pipe, and means for permitting the escape of water from the tank to the pan when said cup like member is relieved of the water pressure through said supply pipe, the filling of the tank flushing the pan by the overflow of water from the tank, and the shut-off of the water permitting the flow of water from the tank to the pan until the openings in the annular pipe are covered, and the passage of air to the interior of the tank is thereby stopped, after which the tubes act upon the barometric principle to maintain a supply of water in the pan.

3. A structure as recited in claim 2, comprising a drain pipe leading from the discharge opening of the pan, and an overflow pipe leading from said drain pipe into the pan and to a point slightly above the openings in the annular pipe.

4. A structure as recited in claim 2, in combination with unions in the overflow pipe and the water supply pipe to permit the bodily removal of the tank and associated parts from the pan.

5. A structure as recited in claim 2, in combination with wires extending between the side of the tank and said annular pipe.

6. A structure as recited in claim 2, in combination with a plurality of wires strung upon a circumferential wire and extending from the side of the tank to and resting upon the outer edge of the pan.

7. A device of the character described, comprising a tank, a pan, and elements upon which the tank is supported, a circumferential perforated pipe extending around the upper outer edge of the pan, a discharge opening centrally of the pan, a drain pipe leading from the discharge opening, a drain valve for closing said discharge opening and water supply pipe extending upwardly into the tank, a member of inverted cup shape slidably mounted upon said supply pipe, said supply pipe having openings in the side thereof, which are uncovered by the upward movement of said cup like member under the influence of the water flowing from the supply pipe, rods connected to said cup like member and extending downwardly, tubes secured to and extending above the bottom of the tank, through which said rods pass, valves upon said rods for closing the lower ends of said tubes, a cross bar carried by the said rods and to which the discharge valve is connected, and overflow pipes extending upwardly from the annular pipe and terminating in an extension which, in turn, terminates adjacent the top of the tank as and for the purposes set forth.

8. A structure as recited in claim 7, in combination with an overflow pipe leading from the drain pipe upwardly into the pan and terminating slightly above the level of the openings in the circumferential pipe.

9. A structure as recited in claim 7, wherein the openings in the circumferential pipe are so disposed as to discharge water tangentially of the pan.

10. A device of the character described, comprising a drinking pan, a barometric tank associated therewith, a drain valve for the pan, a source of water supply for the barometric tank, means for automatically operating the drain valve when the water is turned on to fill the tank and means for supplying a limited amount of water to the drinking pan after the water supply to the tank is cut off.

In testimony whereof I affix my signature.

SHERMAN BARTHOLOMEW.